(12) United States Patent
Schnell et al.

(10) Patent No.: US 11,031,888 B2
(45) Date of Patent: Jun. 8, 2021

(54) OPERATION OF A ROTATING ELECTRIC MACHINE HAVING TWO POSITION SENSORS

(71) Applicant: Conti Temic microelectronic GmbH, Nuremberg (DE)

(72) Inventors: Andreas Schnell, Kammerstein (DE); Michael Winkler, Erlangen (DE); Emanoil Iordache, Corcova (RO)

(73) Assignee: Vitesco Technologies Germany GmbH, Hannover (DE)

( * ) Notice: Subject to any disclaimer, the term of this patent is extended or adjusted under 35 U.S.C. 154(b) by 171 days.

(21) Appl. No.: 15/742,802

(22) PCT Filed: Jul. 5, 2016

(86) PCT No.: PCT/EP2016/065880
§ 371 (c)(1),
(2) Date: Jan. 8, 2018

(87) PCT Pub. No.: WO2017/005755
PCT Pub. Date: Jan. 12, 2017

(65) Prior Publication Data
US 2018/0375450 A1     Dec. 27, 2018

(30) Foreign Application Priority Data
Jul. 8, 2015    (DE) ............. 10 2015 212 812.1

(51) Int. Cl.
*H02P 6/18*     (2016.01)
*H02P 9/00*     (2006.01)

(52) U.S. Cl.
CPC ............. *H02P 6/181* (2013.01); *H02P 9/009* (2013.01); *H02P 2203/05* (2013.01); *H02P 2207/05* (2013.01)

(58) Field of Classification Search
CPC ....... H02P 6/181; H02P 9/009; H02P 2203/05
See application file for complete search history.

(56) References Cited

U.S. PATENT DOCUMENTS 9,369,073 B1 *    6/2016  Tian ..................... H02P 6/20
2005/0216225 A1 * 9/2005  Anghel ................ H02P 6/181
                                                  702/151
(Continued)

FOREIGN PATENT DOCUMENTS

DE         3641538 A1     6/1988
DE        10019161 A1    11/2000
(Continued)

OTHER PUBLICATIONS

Machine translation of WO2008062778A1, 2008.*
(Continued)

*Primary Examiner* — Matthew G Marini

(57) ABSTRACT

The invention relates to a method for operating a rotating electric machine (1) having a rotor (3), a polyphase excitation winding (5) and a commutation apparatus (9) for commutating excitation winding currents of the excitation winding (5) depending on rotor position values (R) for rotor positions of the rotor (3). First measurement values (A) for the rotor positions are detected by means of a first sensor apparatus (13) and second measurement values (B) for the rotor positions are detected by means of a second sensor apparatus (15). For the commutation of the excitation winding currents, the rotor position values (R) are formed from weighted mean values (M) of the first measurement values (A) and the second measurement values (B). In a first rotation speed range of rotor rotation speeds of the rotor (3), the first sensor apparatus (13) has a higher resolution of the rotor positions than the second sensor apparatus (15) and, in the first rotation speed range, the first measurement values (Continued)

(A) are given more weight than the second measurement values (B) when forming the weighted mean values (M).

13 Claims, 1 Drawing Sheet

(56) References Cited

U.S. PATENT DOCUMENTS

| | | |
|---|---|---|
| 2012/0143563 A1 | 6/2012 | Ueda |
| 2013/0035896 A1 | 2/2013 | Ueda et al. |

FOREIGN PATENT DOCUMENTS

| | | | |
|---|---|---|---|
| DE | 10338211 A1 | 4/2004 | |
| DE | 10314696 A1 | 10/2004 | |
| DE | 102005045323 A1 | 4/2006 | |
| DE | 102006032092 A1 | 8/2007 | |
| DE | 102010053468 A1 | 6/2012 | |
| DE | 102010062273 A1 * | 6/2012 | ......... G01D 5/24452 |
| DE | 102012017794 A1 | 3/2013 | |
| DE | 102012222316 A1 | 6/2014 | |
| JP | 0989589 | 4/1997 | |
| JP | 2011069815 A | 4/2011 | |
| JP | 2011099828 A | 5/2011 | |
| WO | WO-2008062778 A1 * | 5/2008 | ............ G01D 5/145 |
| WO | 2011129190 A1 | 10/2011 | |

OTHER PUBLICATIONS

Japanese Office Action dated Dec. 3, 2018 for corresponding Japanese application No. 2017-567202.
International Search Report and Written Opinion dated Sep. 21, 2016 from corresponding International Patent Application No. PCT/EP2016/065880.
Search Report dated Jul. 8, 2015 for corresponding German Patent Application No. 10 2015 212 812.1.
Chinese Office Action dated Jul. 23, 2019 for corresponding Chinese Application No. 201680024030.3.
Japanese Decision to Grant a Patent drafted Jul. 8, 2019 for corresponding Japanese Patent Application No. 2017-567202.
European Patent Office Examination Report dated Sep. 14, 2020 for the counterpart European Patent Application No. 16 738 709.1.

* cited by examiner

OPERATION OF A ROTATING ELECTRIC MACHINE HAVING TWO POSITION SENSORS

FIELD OF INVENTION

The invention relates to a method for operating a rotating electric machine having a rotor, a polyphase excitation winding and a commutation apparatus for commutating excitation winding currents of the excitation winding depending on rotor position values for rotor positions of the rotor. The invention further relates to a measurement apparatus for carrying out the method.

BACKGROUND

Known commutation methods for controlling and regulating polyphase rotating electric machines are so-called sinusoidal commutation and so-called block commutation. Sinusoidal commutation involves generating excitation winding currents that are phase-shifted with respect to one another and are in each case at least approximately sinusoidal. Block commutation involves generating excitation winding currents that likewise have profiles that are phase-shifted with respect to one another, but are in each case approximately constant during a commutation period and change approximately erratically during the transition between the commutation periods.

Particularly at low rotor rotation speeds, sinusoidal commutation enables more accurate regulation of the rotor positions and better synchronism properties and starting properties of an electric machine than block commutation, but it requires a more complex electronics system than block commutation. At high rotor rotation speeds, block commutation generally has hardly any disadvantages compared to sinusoidal commutation, but it can be implemented in a more cost-effective manner than sinusoidal commutation.

Sinusoidal commutation is therefore commonly used only at low rotor rotation speeds, at which the rotor positions are detected by means of a high-resolution sensor apparatus, which is relatively cost-effective but is too slow for high rotor rotation speeds. In contrast, block commutation is preferably used at higher rotor rotation speeds. When sinusoidal commutation at low rotor rotation speeds is combined with block commutation at higher rotor rotation speeds, a switchover is made between sinusoidal commutation and block commutation, for example when a prescribed minimum rotation speed is reached.

SUMMARY

The invention is based on the object of specifying an improved method for operating a rotating electric machine having a rotor, a polyphase excitation winding and a commutation apparatus for commutating excitation winding currents of the excitation winding depending on rotor position values for rotor positions of the rotor. The invention is further based on the object of specifying an apparatus for carrying out the method.

The object is achieved in accordance with the invention with respect to the method by the features of claim 1 and with respect to the apparatus by the features of claim 10.

Advantageous configurations of the invention are the subject matter of the dependent claims.

The method according to the invention relates to the operation of a rotating electric machine having a rotor, a polyphase excitation winding and a commutation apparatus for commutating excitation winding currents of the excitation winding depending on rotor position values for rotor positions of the rotor. In the method, first measurement values for the rotor positions are detected by means of a first sensor apparatus and second measurement values for the rotor positions are detected by means of a second sensor apparatus. For the commutation of the excitation winding currents, the rotor position values are formed from weighted mean values of the first measurement values and the second measurement values. In this case, in a first rotation speed range of rotor rotation speeds of the rotor, the first sensor apparatus has a higher resolution of the rotor positions than the second sensor apparatus, and, in the first rotation speed range, the first measurement values are given more weight than the second measurement values when forming the weighted mean values.

A rotor rotation speed is understood here to mean a number of rotations per unit time of the rotor of the electric machine, wherein said number is not negative, that is to say that it is not different, for example by a sign of the rotor rotation speed, between various rotation directions of the rotor.

The method thus provides for the use of two sensor apparatuses having different resolution capabilities to determine rotor positions of the rotor of a rotating electric machine and the suitable combination of the measurement values detected by the two sensor apparatuses. For this purpose, in a rotation speed range in which a first sensor apparatus has a higher resolution than the second sensor apparatus, first measurement values detected by the first sensor apparatus are given more weight than second measurement values detected by the second sensor apparatus when forming the weighted mean values. The method according to the invention therefore makes it possible, in particular, to give more weight to the measurement values of a first sensor apparatus that resolves the rotor positions more highly than to the measurement values of the second sensor apparatus at low rotor rotation speeds, whereas the measurement values of the second sensor apparatus are given more weight at higher rotor rotation speeds. As a result, it is possible to combine the advantages of a first sensor apparatus having a high resolution of the rotor positions at low rotor rotation speeds with a more cost-effective second sensor apparatus having a weaker resolution of the rotor positions at high rotor rotation speeds. Forming weighted mean values from the first and second measurement values advantageously makes it possible to vary the relative weighting of the first and second measurement values depending on the rotor rotation speed and, as a result, to avoid hard switching over between the use of the first and second measurement values, which can lead to torque jumps and noise generation resulting therefrom.

One configuration of the invention accordingly provides for the first rotation speed range to be limited by the rotation speed of zero. As a result, the measurement values of a first sensor apparatus having a high resolution of the rotor positions are advantageously given more weight at low rotor rotation speeds, at which a high resolution of the rotor positions is required.

One further configuration of the invention provides for the second sensor apparatus to have a higher processing speed of sensor signals than the first sensor apparatus. This configuration is also directed at the second sensor apparatus being predominantly configured for detecting measurement values at high rotor rotation speeds, which require faster processing of sensor signals.

One further configuration of the invention provides, when forming the weighted mean values, for a weighting of the first measurement values to be a monotonically falling and at least partially strictly monotonically falling function of the rotor rotation speed. One further configuration of the invention accordingly provides, when forming the weighted mean values, for a weighting of the second measurement values to be a monotonically increasing and at least partially strictly monotonically increasing function of the rotor rotation speed, said function disappearing at the rotation speed of zero. In accordance with one further configuration of the invention, a rotation speed threshold value is furthermore prescribed and, when forming the weighted mean values, a weighting of the first measurement values is formed in such a way that it disappears at rotor rotation speeds above the rotation speed threshold value.

The aforementioned configurations provide for the weightings of the first and second measurement values to be varied depending on the rotor rotation speed in such a way that the weighting of the second measurement values increases with respect to the weighting of the first measurement values as the rotor rotation speed increases. In particular, configurations of the invention provide for the second measurement values at the rotor rotation speed of zero and for the first measurement values above a rotation speed threshold value not to contribute at all to the weighted mean values. This advantageously makes it possible to form the rotor position values at low rotor rotation speeds primarily or exclusively from the first measurement values of a first sensor apparatus having a high resolution of the rotor positions and at high rotor rotation speeds primarily or exclusively from the second measurement values of a second sensor apparatus having a lower resolution of the rotor positions and, as the rotor rotation speed increases, to increase the proportion of the second measurement values to the weighted mean values with respect to the proportion of the first measurement values. This takes into account the fact that a high resolution of the rotor positions for regulating the commutation of the excitation winding currents is generally only required for low rotor rotation speeds. Using the measurement values of the second sensor apparatus at high rotor rotation speeds avoids a situation in which a costly first sensor apparatus is required, which is also suitable for detecting measurement values having a high resolution of the rotor positions at high rotor rotation speeds.

One further configuration of the invention provides for rotor rotation speeds of the rotor to be determined from the detected first measurement values and/or second measurement values. This configuration of the invention thus provides for not only the rotor position values but also the rotor rotation speeds of the rotor to be determined from the first and/or second measurement values. As a result, advantageously, no separate incremental encoder is required for detecting the rotor rotation speeds.

One further configuration of the invention provides for the weighted mean values of the first measurement values and the second measurement values to be smoothed and for the rotor position values to be formed as the smoothed weighted mean values. Smoothing is preferably effected here by way of low-pass filtering of the weighted mean values.

This configuration of the invention serves to smooth the weighted mean values, if necessary, in order to be able to use them as rotor position values for sinusoidal commutation of the excitation winding currents. Smoothing of this kind is necessary, in particular at high rotor rotation speeds, when the second sensor apparatus has an only very coarse resolution of the rotor positions, as is the case, for example, in the event of customary sensor apparatuses having Hall switches having an angular resolution of approximately 60 degrees for the rotor positions.

One further configuration of the invention provides for the commutation of the excitation winding currents by means of the commutation apparatus to be carried out as sinusoidal commutation for all rotor rotation speeds. The sinusoidal commutation of the excitation winding currents is generated, for example, by means of a pulse-width modulation controlled by a space vector modulation. This configuration of the invention advantageously avoids a situation in which two different commutation methods are used and have to be implemented, for example sinusoidal commutation at low rotor rotation speeds and block commutation at high rotor rotation speeds. In particular, switching over between these two commutation methods is avoided, said switching over being able to lead to torque jumps and noise generation resulting therefrom.

A measurement apparatus according to the invention comprises a first sensor apparatus for detecting the first measurement values for the rotor positions, a second sensor apparatus for detecting the second measurement values for the rotor positions and an evaluation unit, which is configured to form the rotor position values for the commutation of the excitation winding currents from weighted mean values of the first measurement values and the second measurement values. In this case, in the first rotation speed range of rotor rotation speeds of the rotor, the first sensor apparatus has a higher resolution of the rotor positions than the second sensor apparatus, and, in the first rotation speed range, the evaluation unit is configured to give more weight to the first measurement values than the second measurement values when forming the weighted mean values and to output the rotor position values formed by said evaluation unit to the commutation apparatus.

A measurement apparatus of this kind is suitable for carrying out the method according to the invention having the advantages mentioned above.

The first sensor apparatus preferably comprises at least one angular position sensor for detecting the first measurement values for the rotor positions and/or the second sensor apparatus preferably comprises at least three Hall switches having an angular resolution of approximately 60 degrees for the rotor positions. Suitable angular position sensors of the first sensor apparatus are, for example, magnetoresistive sensors, the measurement principle of which is based on the GMR (giant magnetoresistance) effect or AMR (anisotropic magnetoresistive) effect, or are Hall sensors. Angular position sensors and Hall switches of this kind are established and commercially available sensors for detecting rotor positions and are therefore particularly suitable as sensors for the first sensor apparatus or second sensor apparatus.

The evaluation unit is preferably configured to determine rotor rotation speeds of the rotor from the detected first and/or second measurement values. As a result, advantageously, no separate incremental encoder is required for detecting the rotor rotation speeds.

The evaluation unit is preferably furthermore configured to smooth the weighted mean values of the first measurement values and the second measurement values and to form the rotor position values as the smoothed weighted mean values. This advantageously makes it possible to be able to use the smoothed weighted mean values as rotor position values for sinusoidal commutation of the excitation winding currents if the second sensor apparatus has an only very coarse resolution of the rotor positions, as is the case, for example, in the event of a second sensor apparatus having Hall switches having an angular resolution of approximately 60 degrees for the rotor positions.

A rotating electric machine according to the invention comprises a rotor, a polyphase excitation winding, a commutation apparatus for commutating excitation winding currents of the excitation winding depending on rotor position values for rotor positions of the rotor and a measurement apparatus according to the invention.

BRIEF DESCRIPTION OF THE DRAWING

The properties, features and advantages of this invention that are described above and also the manner in which they are achieved will become clearer and more distinctly comprehensible in connection with the description of exemplary embodiments that follows, said exemplary embodiments being explained in more detail in connection with the drawings, in which.

DETAILED DESCRIPTION

In the figures, the same reference signs are used for mutually corresponding parts.

Figure 1:
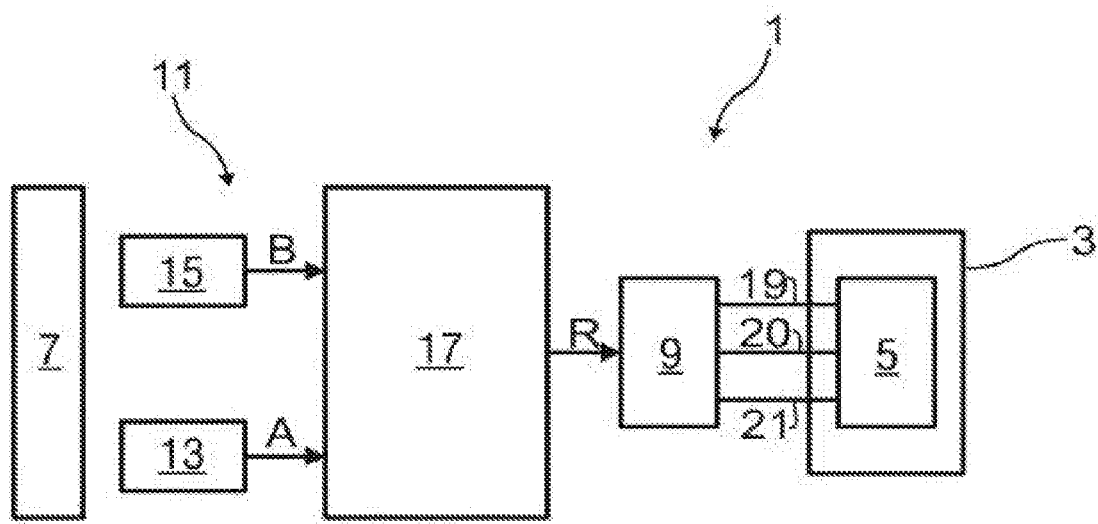
FIG. 1 shows a block diagram of a rotating electric machine.

FIG. 1 shows a block diagram of a rotating electric machine 1, which is designed as an electric motor. The electric machine 1 comprises a stator 3 having a three-phase excitation winding 5, a rotor 7, a commutation apparatus 9 and a measurement apparatus 11, which comprises a first sensor apparatus 13, a second sensor apparatus 15 and an evaluation unit 17.

The commutation apparatus 9 is designed for electronic sinusoidal commutation of the excitation winding currents of the excitation winding 5 depending on rotor position values R for rotor positions of the rotor 7. In a typical and known embodiment of the commutation apparatus 9, said commutation apparatus comprises a half bridge for each phase of the excitation winding 5, said half bridge having two electronic switching units and being connected to an external conductor 19 to 21 of the respective phase. The sinusoidal commutation of the excitation winding currents is preferably generated in a known manner by means of a pulse-width modulation, controlled by a space vector modulation, of the excitation winding currents depending on the rotor position values R.

The rotor position values R are formed, in a manner explained in more detail below with reference to FIG. 2, by the evaluation unit 17 from measurement values A, B for rotor positions of the rotor 7 and are fed to the commutation apparatus 9, wherein first measurement values A are detected by the first sensor apparatus 13 and second measurement values B are detected by the second sensor apparatus 15 and are fed in each case to the evaluation unit 17.

At low rotor rotation speeds, that is to say in a first rotation speed range of rotor rotation speeds of the rotor 7 that is limited by the rotation speed of zero, the first sensor apparatus 13 has a higher resolution of the rotor positions than the second sensor apparatus 15. For example, the first sensor apparatus 13 comprises at least one Hall sensor, which is designed for high-resolution detection of the rotor positions at low rotor rotation speeds. In contrast, the second sensor apparatus 15 comprises, for example, a plurality of Hall switches having a lower angular resolution of approximately 60 degrees for the rotor positions in each case.

Figure 2:
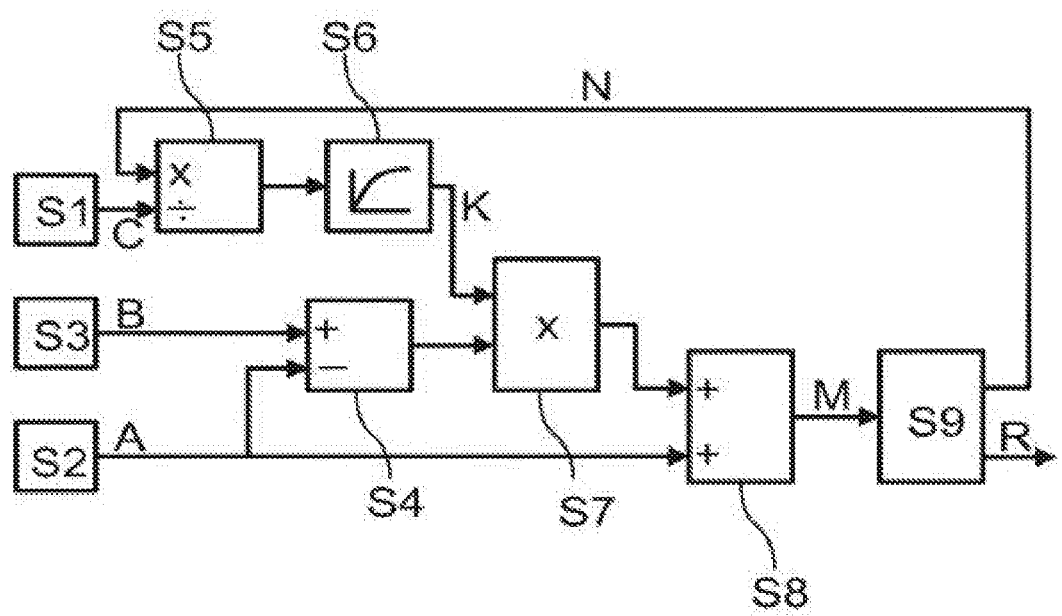
FIG. 2 shows a flow chart of a method for operating a rotating electric machine.

FIG. 2 shows a flow chart of a method for operating the rotating electric machine 1.

In a first method step S1, a rotation speed threshold value C is prescribed and stored. In a second method step S2, the first measurement values A are detected by means of the first sensor apparatus 13. In a third method step S3, the second measurement values B are detected by means of the second sensor apparatus 15. In each case, a first measurement value A and a second measurement value B are detected here in successive measurement time intervals, that is to say that in each case a first measurement value A and a second measurement value B are detected repeatedly and at least approximately simultaneously. In the following text, a first measurement value A and a second measurement value B are referred to as mutually corresponding when they are detected during the same measurement time interval.

In a fourth method step S4, a difference B-A of the second measurement value B and the first measurement value A corresponding thereto that are detected in the measurement time interval is formed for each measurement time interval.

In a fifth method step S5, a ratio N/C of an instantaneous rotation speed value N of the rotor rotation speed and the rotation speed threshold value C is formed for each measurement time interval.

In a sixth method step S6, for each measurement time interval, a weighting factor K is formed depending on the ratio N/C formed in the fifth method step S5, said weighting factor assuming values from the interval [0,1] having the interval limits zero and one. The weighting factor K is a monotonically increasing function of the ratio N/C, said function assuming the value of zero for N=0, increasing approximately linearly in the range of small values of the ratio N/C and assuming the value of one for values of the ratio N/C that are greater than one.

In a seventh method step S7, for each measurement time interval, a weighted product K(B−A) is formed from the difference B-A formed in the fourth method step S4 for the measurement time interval and the weighting factor K determined in the sixth method step S6 for the measurement time interval.

In an eighth method step S8, for each measurement time interval, a weighted mean value M of the first measurement value A and the second measurement value B is formed as the sum M=KB+(1−K)A of the first measurement value A detected in the third method step S3 during the measurement time interval and the weighted product K(B−A) formed in the seventh method step S7 for the measurement time interval. Since the weighting factor K is a monotonically increasing function of the ratio N/C and hence also of the rotation speed value N, the weighting of the first measurement values A when forming the weighted mean values M is a monotonically falling function of the rotation speed value N, whereas the weighting of the second measurement values B when forming the weighted mean values M is a monotonically increasing function of the rotation speed value N. Since the weighting factor K assumes the value of zero at N=0, the weighted mean values M at N=0 are identical to the respective first measurement values A. Since the weighting factor K assumes the value of one for N>C, the weighted mean values M for N>C are identical to the respective second measurement values B. The proportions of the first measurement values A to the weighted mean values M therefore decrease as the rotor rotation speed increases between N=0 and N=C and disappear for rotation speed values N that exceed the rotation speed threshold value C. The proportions of the second measurement values B to the weighted mean values M disappear at N=0 and increase between N=0 and N=C.

In a ninth method step S9, for each measurement time interval, the weighted mean value M formed in the eighth method step S8 is smoothed and output as a rotor position value R to the commutation apparatus 9. The smoothing is carried out as low-pass filtering of the weighted mean values M, such that the resulting rotor position values R can be used as input signals for sinusoidal commutation of the excitation winding currents.

Furthermore, in the ninth method step S9, the rotation speed values N are optionally determined from the weighted mean values M, said rotation speed values being used in the first method step S1. As an alternative thereto, the rotation speed values N are not determined from the weighted mean values M, but are detected by means of a separate incremental encoder (not illustrated in FIG. 1).

The method steps S4 to S9 are carried out by the evaluation unit and implemented by software or a programmable logic controller.

Although the invention has been illustrated and described in more detail by way of preferred exemplary embodiments, the invention is not restricted by the disclosed examples and other variations can be derived therefrom by a person skilled in the art without departing from the scope of protection of the invention.

LIST OF REFERENCE SIGNS

1 Electric machine
3 Stator
5 Excitation winding
7 Rotor
9 Commutation apparatus
11 Measurement apparatus
13 First sensor apparatus
15 Second sensor apparatus
17 Evaluation unit
19 to 21 External conductor
S1 to S9 Method step
A First measurement value
B Second measurement value
C Rotation speed threshold value
K Weighting factor
M Weighted mean value
N Rotation speed value
R Rotor position value

The invention claimed is:

1. A method for operating a rotating electric machine having a rotor, a polyphase excitation winding and a commutation apparatus for commutating excitation winding currents of the excitation winding depending on rotor position values for rotor positions of the rotor, comprising:
detecting first measurement values for the rotor positions by a first sensor,
detecting second measurement values for the rotor positions by a second sensor, and
forming from weighted mean values of the first measurement values and the second measurement values the rotor position values for the commutation of the excitation winding currents,
wherein, in a first rotation speed range of rotor rotation speeds of the rotor, the first sensor has a higher resolution of the rotor positions than the second sensor, and
wherein, in the first rotation speed range, the first measurement values are given more weight than the second measurement values when forming weighted mean values,
wherein the first sensor comprises at least one magnetoresistive or at least one Hall sensor positioned relative to the rotor to directly sense angular rotor position thereof as the first measurement values for the rotor positions, and
wherein the second sensor comprises at least three Hall switches which are positioned relative to the rotor to directly sense angular rotor position, the at least three Hall switches having an angular resolution of approximately 60 degrees for the rotor positions,
wherein forming the rotor position values for the commutation of the excitation winding currents comprises:
storing a rotation speed threshold value;
determining a difference between the second measurement value and the first measurement value;
determining a ratio of an instantaneous rotational speed value of the rotor to the rotation speed threshold value;
forming a weighting factor based upon the ratio of the instantaneous rotational speed value of the rotor to the rotation speed threshold value;
forming a weighted product based upon a product of the weighting factor and a difference between the first measurement value and the second measurement value; and
forming a weighted mean value of the first measurement value and the second measurement value as a sum of the first measurement value and the weighted product, and
wherein the instantaneous rotational speed value of the rotor is based upon the weighted mean value.

2. The method as claimed in claim 1, wherein the first rotation speed range is limited by the rotation speed of zero.

3. The method as claimed in claim 1, wherein, when forming the weighted mean values, a weighting of the first measurement values is a monotonically falling and at least partially strictly monotonically falling function of the rotor rotation speed.

4. The method as claimed in claim 1, wherein, when forming the weighted mean values, a weighting of the second measurement values is a monotonically increasing and at least partially strictly monotonically increasing function of the rotor rotation speed, said function disappearing at the rotation speed of zero.

5. The method as claimed in claim 1, wherein a rotation speed threshold value is prescribed and, when forming the weighted mean values, a weighting of the first measurement values disappears at rotor rotation speeds above the rotation speed threshold value.

6. The method as claimed in claim 1, wherein rotor rotation speeds of the rotor are determined from at least one of the detected first measurement values or the detected second measurement values.

7. The method as claimed in claim 1, wherein the weighted mean values of the first measurement values and the second measurement values are smoothed and the rotor position values are formed as a smoothed weighted mean values.

8. The method as claimed in claim 1, wherein the commutation of the excitation winding currents by the commutation apparatus is a sinusoidal commutation for all rotor rotation speeds.

9. The method as claimed in claim 8, wherein the sinusoidal commutation of the excitation winding currents is generated by a pulse-width modulation controlled by a space vector modulation.

10. The method as claimed in claim 1, wherein forming the rotor position values for the commutation of the excitation winding currents further comprises low-pass filtering the weighted mean value to generate a rotor position value for sinusoidal commutation of the excitation winding currents of the excitation winding.

11. A rotating electric machine, comprising:
a rotor,
a polyphase excitation winding,
a commutation apparatus configured to commutate excitation winding currents of an excitation winding depending on rotor position values for rotor positions of the rotor, and
a measurement apparatus for operating the rotating electric machine, the measurement apparatus comprising:
   a first sensor configured to detect first measurement values for the rotor positions,
   a second sensor configured to detect second measurement values for the rotor positions and
   an evaluation unit configured to form rotor position values for commutation of the excitation winding currents from weighted mean values of the first measurement values and the second measurement values,
wherein, in a first rotation speed range of rotor rotation speeds of the rotor, the first sensor has a higher resolution of the rotor positions than the second sensor,
wherein, in the first rotation speed range, the evaluation unit is configured to give more weight to the first measurement values than the second measurement values when forming weighted mean values and to output the rotor position values formed by said evaluation unit to the commutation apparatus,
wherein the first sensor comprises at least one magnetoresistive sensor or at least one Hall sensor positioned relative to the rotor to directly sense angular rotor position as the first measurement values for the rotor position, and
wherein the second sensor comprises at least three Hall switches positioned relative to the rotor to directly sense angular rotor position, the at least three Hall switches having an angular resolution of approximately 60 degrees for the rotor positions.

12. The rotating electric machine as claimed in claim 11, wherein the evaluation unit is configured to determine rotor rotation speeds of the rotor from at least one of the detected first measurement values or the detected second measurement values.

13. The rotating electric machine as claimed in claim 11, wherein the evaluation unit is configured to smooth the weighted mean values of the first measurement values and the second measurement values and to form the rotor position values as the smoothed weighted mean values.

* * * * *